C. E. NIELSEN.
NUT LOCK.
APPLICATION FILED JULY 30, 1910.

999,842.

Patented Aug. 8, 1911.

2 SHEETS—SHEET 1.

Witnesses:
Joe. P. Mahler.
M. L. Lowv.

Inventor
Carl E. Nielsen.
By Woodward & Chandlee
Attorneys

C. E. NIELSEN.
NUT LOCK.
APPLICATION FILED JULY 30, 1910.
999,842.
Patented Aug. 8, 1911.
2 SHEETS—SHEET 2.
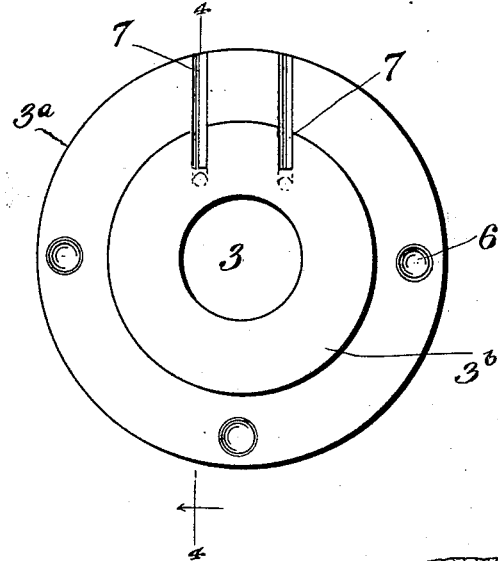
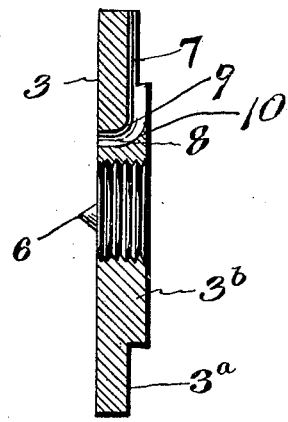
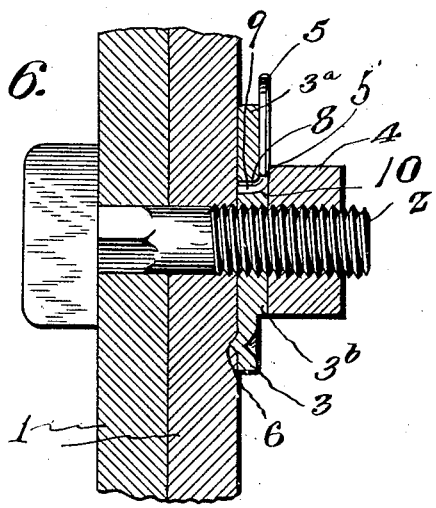
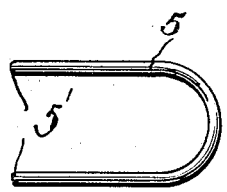
Witnesses
Joe. P. Wahlee.
M L Lowe.
Inventor,
Carl E. Nielsen.
By Woodward & Chandlee.
Attorneys
COLUMBIA PLANOGRAPH CO., WASHINGTON, D. C.

ved with the rear curved walls 10, against

UNITED STATES PATENT OFFICE.

CARL EMIL NIELSEN, OF MADERA, MEXICO.

NUT-LOCK.

999,842.  Specification of Letters Patent.  Patented Aug. 8, 1911.

Application filed July 30, 1910. Serial No. 574,724.

*To all whom it may concern:*

Be it known that I, CARL EMIL NIELSEN, a citizen of the United States of Mexico, residing at Madera, in the State of Chihuahua, Mexico, have invented certain new and useful Improvements in Nut-Locks, of which the following is a specification.

This invention relates to devices for locking nuts or bolts.

An object of this invention is to provide a nut locking device, which will effectually prevent the nut from turning.

Another object of this invention is to provide simple means by which the washer may be locked against rotation and the nut locked to the washer.

A further object of this invention is to provide a device of this kind which will be simple in construction, and cheap to manufacture.

With these and other objects in view the invention consists in the construction, combination and arrangement of parts, as will be more fully hereinafter described and pointed out in the claims, but it will be understood that changes in the specific structure may be made within the scope of the claims, without departing from the spirit of the invention.

Figure 1:
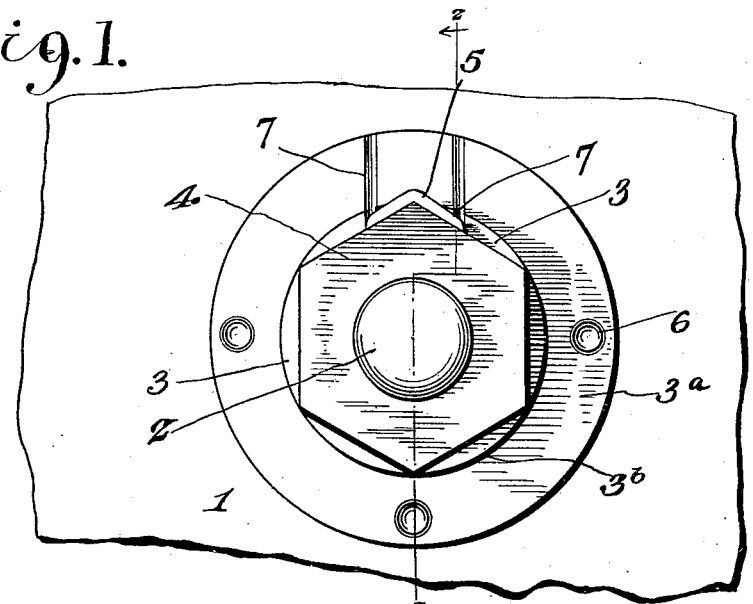
Figure 2:
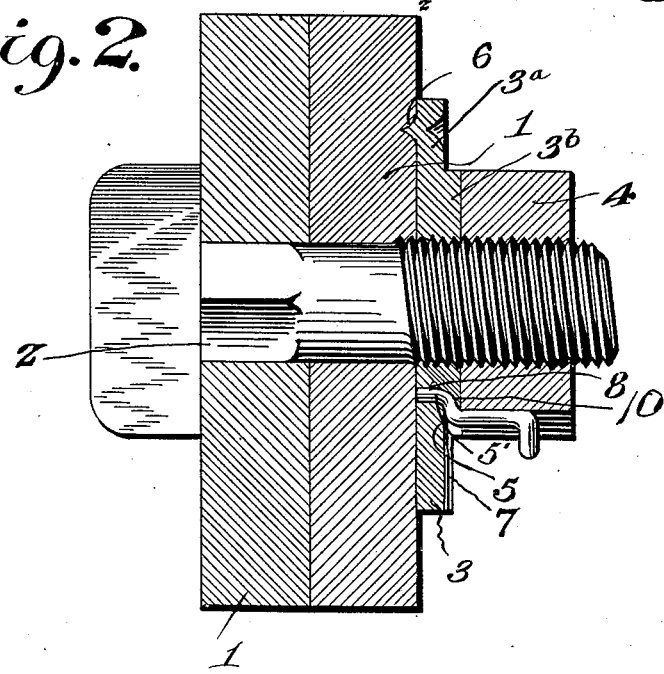

In the drawings, Figure 1 is a top plan view of a bolt and nut provided with my locking device, Fig. 2 is a vertical sectional view on the irregular line 2—2 of Fig. 1, Fig. 3 is a top plan view of my washer, Fig. 4 is a sectional view on the line 4—4 of Fig. 3, Fig. 5, is a detailed view of my U-shaped locking pin, Fig. 6 is a view similar to Fig. 2, showing my locking pin in position to be driven into place, a square nut being used.

Referring to the drawings, 1 indicates the parts to be bolted together, 2 the bolt passing therethrough, 3 the washer, 4 the nut, and 5 the locking pin.

My invention lies in the construction of the washer and the locking pin, and the manner in which the locking pin is forced into position.

The washer comprises a comparatively thin outer portion 3ª and a central boss 3ᵇ to receive the nut thereagainst. The washer is provided upon its lower face with a plurality of downwardly extending prongs 6, adapted to bite into the material to be bolted. Formed in the upper face of the washer 3, are two parallel grooves 7, communicating with the vertical passages 8, formed in the boss 3ᵇ. The U-shaped locking pin 5, is adapted to be forced along the grooves 7, and into the passages 8, as will be later described.

In use, the bolt is passed through the aperture in the parts to be bolted together, and the washer is placed in position over the bolt, the prongs 6, entering the material, when the nut is screwed down tightly against the washer 3. The U-shaped locking pin is then placed in position with its legs in the grooves 7, is forced along until the ends 5'' reach the curved walls 9 of the vertical passages 8. As the driving is continued the ends of the locking pin will be turned downwardly into the passages 8, and their extremities abut against the face of the plate 1. After the U-shaped locking pin 5 is driven clear in, the outer end is bent upwardly to engage the faces of the nut 4, as best seen in Fig. 1.

It will be readily seen that the prongs 6 prevent the washer from turning, and that the locking pin 5 prevents the nut from turning, thus the parts are securely locked.

The vertical passages 8, extend downwardly through the washer, and have the curved portions 9 connecting the passages with the parallel grooves 7, and are provided with the rear curved walls 10, against which the free ends 5' of the locking pin are adapted to engage and be turned downward into the said passages.

What is claimed is:

In a nut lock, the combination with a nut and bolt, of a washer provided with a relatively thin portion, a central upstanding boss, said thin portion being provided with parallel grooves extending from the outer periphery thereof, and communicating with vertically extending passages formed in said boss, and parallel with the bolt opening in said nut, and a locking pin, and a rear arched wall at the upper end of said passages, said locking pin having legs adapted to be forced along said grooves, to abut against said arched wall, whereby said legs are deflected downwardly through said
5 vertically extending passages, and having its bight portion bent to engage the adjacent sides of the nut.

In testimony whereof I affix my signature, in presence of two witnesses.

CARL EMIL NIELSEN.

Witnesses:
JOSEPH L. FOUTZ,
RAY FARNSWORTH.

Copies of this patent may be obtained for five cents each, by addressing the "Commissioner of Patents, Washington, D. C."